United States Patent
Bissonnette et al.

(10) Patent No.: US 6,296,087 B1
(45) Date of Patent: Oct. 2, 2001

(54) WET DISC BRAKE WITH INTERNAL DRIVE/EXTERNAL COOLER

(75) Inventors: Lee A. Bissonnette, Clarkston; Barry S. Groves, Roseville, both of MI (US)

(73) Assignee: Meritor Heavy Vehicle Systems, LLC, Troy, MI (US)

(*) Notice: Subject to any disclaimer, the term of this patent is extended or adjusted under 35 U.S.C. 154(b) by 0 days.

(21) Appl. No.: 09/427,814

(22) Filed: Oct. 27, 1999

(51) Int. Cl.[7] .................................................. F16D 65/78
(52) U.S. Cl. ........................................................ 188/264 F
(58) Field of Search .......................... 188/264 R, 264 B, 188/264 D, 264 E, 264 F, 264 LL, 264 P

(56) References Cited

U.S. PATENT DOCUMENTS

| | | | |
|---|---|---|---|
| 3,118,387 | * | 1/1964 | Aldrich ............................ 188/264 P |
| 3,590,960 | * | 7/1971 | Reynolds ......................... 188/264 P |
| 3,592,304 | * | 7/1971 | Thompson ....................... 188/264 P |
| 3,730,301 | * | 5/1973 | Heck et al. ...................... 188/264 P |
| 3,814,222 | * | 6/1974 | Koivunen ........................ 188/264 P |
| 3,907,073 | * | 9/1975 | Harrison ......................... 188/264 P |
| 4,069,906 | * | 1/1978 | Handke ........................... 188/264 P |
| 4,508,200 | * | 4/1985 | Cigognini ....................... 188/264 P |
| 4,736,821 | * | 4/1988 | Ries ................................. 188/264 P |
| 5,190,123 | * | 3/1993 | Hvolka ............................. 188/71.6 |

* cited by examiner

Primary Examiner—Robert J. Oberleitner
Assistant Examiner—Devon Kramer
(74) Attorney, Agent, or Firm—Carlson, Gaskey & Olds

(57) ABSTRACT

A wet disc brake and axle fluid cooling assembly is disclosed which is driven by a vehicle's axle shaft. The system comprises a brake housing, an axle shaft connected to the brake housing wherein the brake fluid can flow between the brake housing and the axle housing, an internal pump connected to the axle housing, and an external cooling tube disposed between the internal pump and the brake housing. An axle shaft is rotatingly disposed within the axle housing. A first spur gear is connected to and rotates with the axle shaft. The internal pump is comprised of an axle straight tee fitting, a pump rod rotatingly connected to the tee fitting, a propeller connected to and rotating with the pump rod that draws the fluid from either the axle housing or the brake housing, and a second spur gear that engages with the first spur gear. The axle shaft drives the pump rod as the shaft rotates, either clockwise or counter-clockwise.

13 Claims, 2 Drawing Sheets

WET DISC BRAKE WITH INTERNAL DRIVE/EXTERNAL COOLER

BACKGROUND OF THE INVENTION

This invention generally relates to a wet disc brake cooling system and more particularly to a wet disc brake cooling system that is powered by the vehicle's axle shaft.

Heat builds up in wet disc brake systems due to the numerous frictional forces within the brake system. As heat builds up within the brake housing, the temperature of the brake fluid within the brake housing increases. The high temperature of the brake environment also increases the temperature of other vehicle components, namely the axle housing. There are several known systems used to reduce the temperature of the brake fluid, thus reducing the heat build up within the wet disc brake system.

One system involves forced cooling of the wet disc brake. Forced cooling requires cooling lines and an external pump that pumps brake fluid out of the brake housing, through the cooling lines and back into the brake housing. This system is strictly limited to drawing the brake fluid from the brake housing, cooling the fluid, and directing the fluid back to the brake housing. There are several disadvantages of this system. First, it is expensive because a separate part, the external pump, needs to be included in the system. Second, the additional part increases the overall weight of the vehicle. Third, the system only cools the brake environment. This system does not actively cool the axle housing environment.

Another system is a sump cooling system through the axle. In this type of system the fluid flows freely between the brake housing and the axle housing. The sump cooling system does not require any forced cooling lines. Rather, the brake fluid flows from an environment with an increased temperature, the brake housing, to a cooler environment, the axle housing. The disadvantage of the sump cooling system is that a high thermal cooling gradient develops between the brake and axle.

SUMMARY OF THE INVENTION

In general terms, a disclosed wet disc brake cooling system overcomes the above problems with other types of wet disc brake cooling systems by increasing the transfer of thermal energy from the axle and brake housings into the surrounding ambient air without an external cooling system. The disclosed invention has the advantage of the sump cooling system, in that the fluid freely flows between the brake housing and the axle housing without the attendant disadvantages. The wet disc brake fluid cooling system cools the fluid by drawing the brake fluid either out of the brake housing or the axle housing. The system includes an internal pump for drawing the brake fluid into an external cooling tube for reducing the temperature of the fluid and guiding the fluid back to either the axle housing or the brake housing, depending upon the flow of the fluid. The internal pump is driven by the vehicle's axle shaft.

These and other features of the invention may be best understood from the following specification and drawings. The following is a brief description of the drawings.

DETAILED DESCRIPTION OF THE PREFERRED EMBODIMENT

Figure 1:
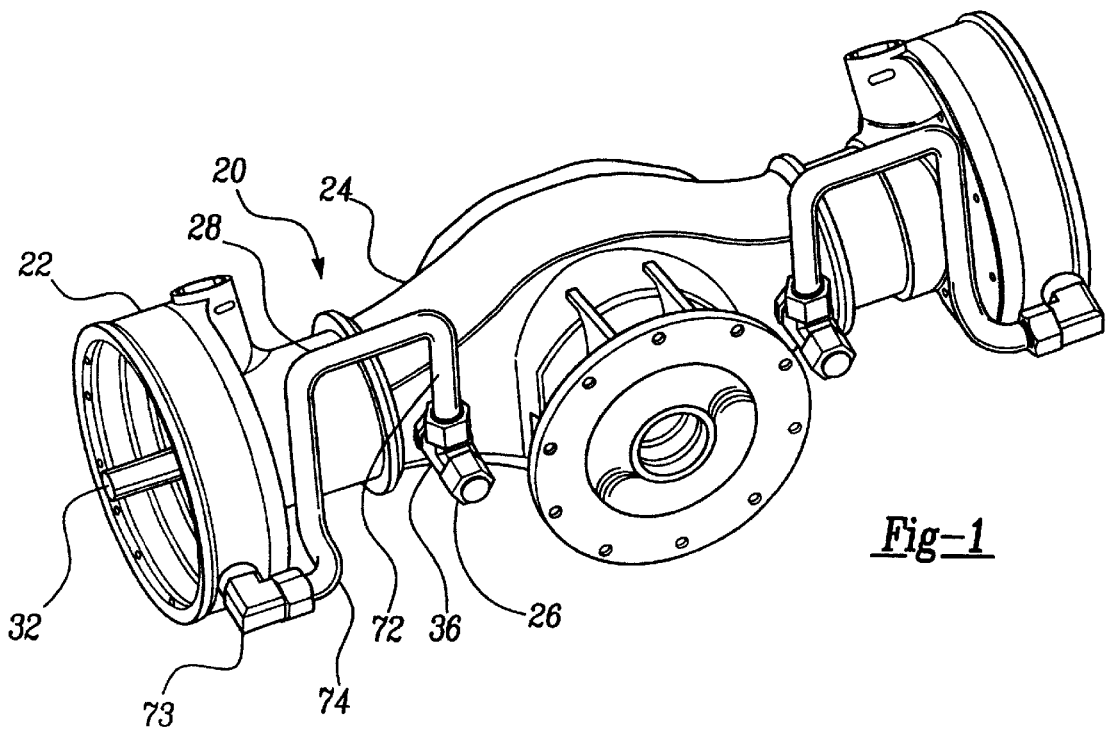
FIG. 1 is a schematic illustration of a system designed according to this invention.

FIG. 1 illustrates a wet disc brake cooling system, generally shown at 20. The brake cooling system 20, preferably includes a brake housing 22, an axle housing 24, an internal pump generally shown at 26, and an external cooling tube 28. The brake housing 22 and the axle housing 24 are connected such that the fluid in the brake housing can flow from the brake housing 22 to the axle housing 24 and vice versa.

The internal pump 26 draws brake fluid that is at an elevated temperature from the axle housing 24 to the external cooling tube 28. As the brake fluid flows through the external cooling tube 28, its temperature decreases. The external cooling tube 28 also guides the brake fluid back into the brake housing 22. The system also works in the opposite direction. In other words, the brake fluid can be drawn from the brake housing 22, through the external cooling tube 28 and directed back to the axle housing 24.

Fluid is cooled when it comes into contact with cool surfaces containing the fluid. When the fluid is drawn into the external cooling tube 28, it has contact with a larger surface area than if it was only contained within the brake and axle housings 22, 24. As a result, there is a greater opportunity for the fluid to cool, thus reducing the fluid's temperature. The surface area of the external cooling tube 28 transfers a fixed amount of heat into the surrounding air based upon the tube's gradient temperature and the ambient air temperature surrounding the external cooling tube. The length of external tubing 28 and pump fluid flow rate are the main factors in determining the thermal transfer from the fluid to the ambient surrounding air. The design length of the tube is a trade off of cooling efficiency against pumping losses.

Figure 2:
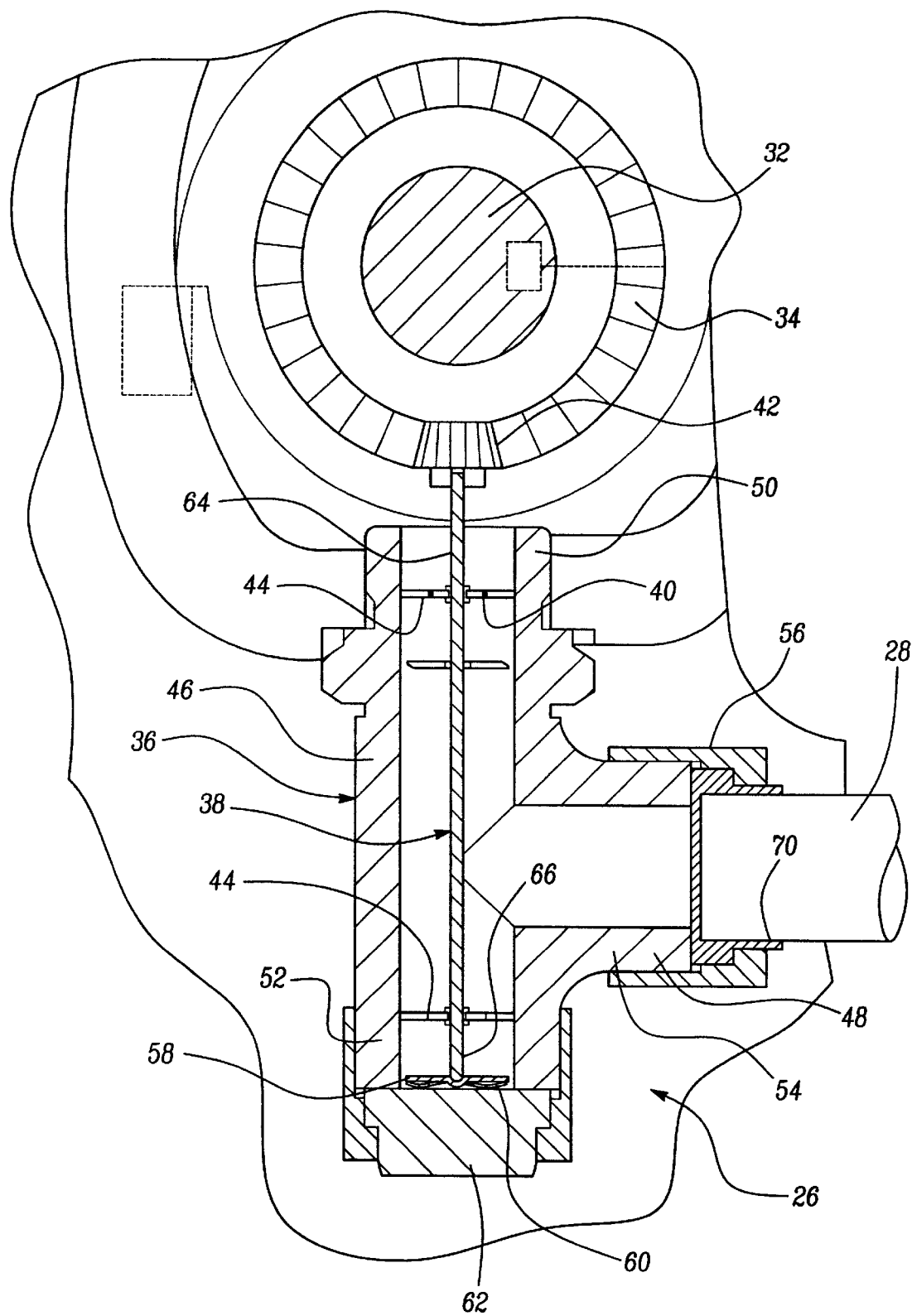
FIG. 2 is a schematic illustration of selected portions of the system of FIG. 1.

As shown in FIG. 2, an internal axle shaft 32 is rotatingly connected to the axle housing 24. A first spur gear 34 is connected to the internal axle shaft 32. The internal axle shaft 32 drives the internal pump 26.

As shown in FIG. 2, the internal pump 26 comprises an axle straight tee fitting 36, a pump rod 38 rotatingly connected to the tee fitting 36, a propeller 40, and a second spur gear 42. The internal pump 26 also includes washer guide assemblies 44 that guides the pump rod 38.

The tee fitting 36 is comprised of a first section 46 and a second section 48. The first section 46 of the tee fitting 36 has a first end 50 and a second end 52. The second section 48 of the tee fitting 36 also has a first end 54 and a second end 56. The first end 54 of the second section 48 is connected to the first section 46 between the first end 50 and the second end 52. The second end 56 of the second section 48 is connected to the external cooling tube 28 via a tube nut sleeve 68 and a tube nut 70. The first end 50 of the first section 46 is connected to the axle housing 24. The second end 52 of the first section 46 is closed off with a fitting cap 62.

The external cooling tube 28 also has a first end 72 and a second end 74. The first end 72 of the external cooling tube 28 is connected to the second end 56 of the tee fitting second section 48. The second end 74 of the external cooling tube 28 is connected to the brake housing 22 via an L-fitting 73. The external cooling tube 28 is preferably U-shaped, however, many different configurations are possible.

The pump rod 38 is positioned and rotates within the first section 46 of the tee fitting 36. The pump rod 38 has a first end 64 and a second end 66. The first end 64 of the pump rod 38 is aligned with the first end 50 of the tee fitting first section 46 but extends beyond the tee fitting first section 46 into the axle housing 24.

A second spur gear 42 is connected to the first end 64 of the pump rod 38. The second spur gear 42 mates with the first spear gear 34 connected to the axle shaft 32. The gear 34, 42 is end loaded through the second end 66 of the pump rod 38 by a wave washer 60 and a spherical washer 58 in the fitting cap 62. Preferably two washer guide assemblies 44 are used to guide and center the pump rod 38 as it rotates.

The first spur gear 34 rotates with the axle shaft 32, either clockwise or counter-clockwise. The movement of the first spur gear 34 causes the second spur gear 42 to rotate, since the two gears 34, 42 are engaged. Further, the rotation of the second spur gear 42 forces the pump rod 38 to rotate. Thus, the axle shaft 32 motion drives the internal pump 26.

A propeller 40 is connected to the pump rod 38, preferably between the two washer guide assemblies 44. The propeller 40 rotates as the pump rod 38 rotates. The rotation of the propeller 40 acts as a pump by drawing fluid out of the axle housing 24. The system works regardless of the direction the axle shaft 32 is rotating. In other words, the propeller 40 either draws fluid from the axle housing 24 or the brake housing 22. If the fluid is drawn from the axle housing 24, it is directed through the external cooling tube 28 and deposited into the brake housing 22. Alternatively, if the fluid is drawn from the brake housing 22, it is directed through the external cooling tube 28 and deposited into the axle housing 24.

Figure 3:
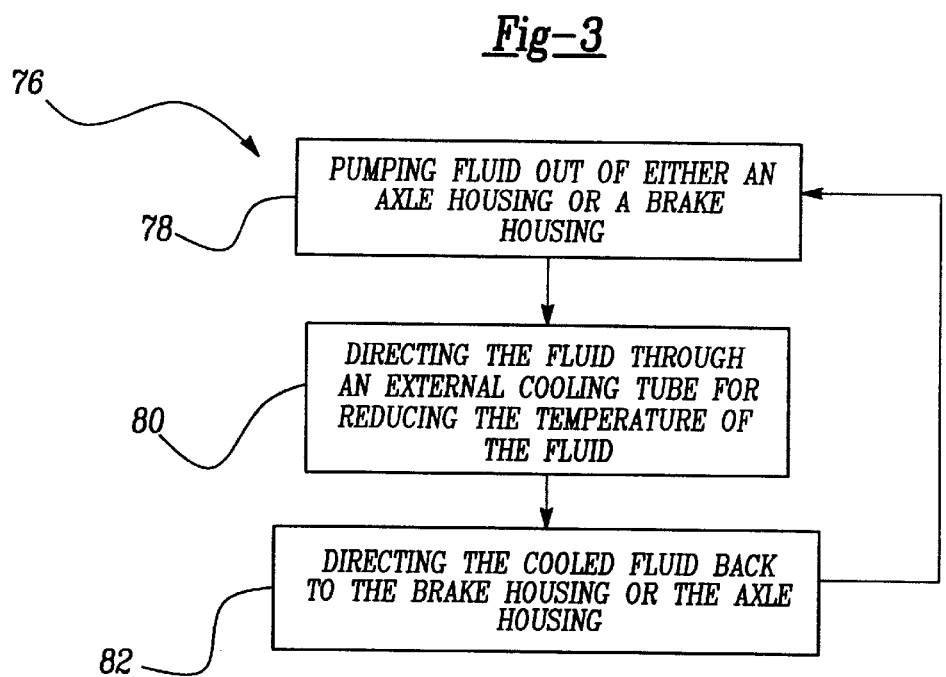
FIG. 3 is a flowchart diagram illustrating the preferred method of this invention.

FIG. 3 schematically illustrates the preferred method of operating the system 20. The flow chart 76 includes a first step at 78 where the fluid is pumped out of the axle housing 24. The fluid is directed through the external cooling tube 28 to reduce the fluid's temperature at 80. At 82 the cooled fluid is directed into the brake housing 22. As can be appreciated from the flow chart 76, the system 20 preferably continuously cycles the fluid through the external cooling tube 28.

Alternatively, the brake housing 22 at step 78 and directed through the external cooling tube 28 to reduce the fluid's temperature at 80. At 82 the cooled fluid id directed into the axle housing 24.

This system is preferably for one wheel on the vehicle. There are identical systems for each wheel on the vehicle.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A wet disc brake and axle fluid cooling system comprising:
   an axle housing;
   a brake housing supported on said axle housing;
   a pump located inside one of said axle or brake housings and driven by an axle shaft that is an internal axle shaft rotatingly connected to said axle housing wherein said system draws fluid out of said brake housing to cool the fluid and wherein the fluid can flow from said brake housing to said axle housing; said pump being internal for drawing brake fluid from said axle housing;
   an external cooling tube connected to said internal pump and said brake housing for reducing the temperature of the fluid and guiding the fluid back to said brake housing wherein said internal pump draws brake fluid from said brake housing and said external cooling tube guides the fluid back to said axle housing; and
   a first spur gear in direct driving engagement with said internal axle shaft to drive said pump.

2. The cooling system of claim 1, wherein said internal pump comprises:
   an axle straight tee fitting connected to said axle housing and said external cooling tube;
   a pump rod rotatingly connected to said tee fitting, said rod having a first end extending into said axle housing;
   a propeller connected to said pump rod for drawing said fluid through said cooling tube;
   a second spur gear connected to said pump rod at said first end, wherein said second spur gear operatively engages with said first spur gear.

3. The cooling system of claim 2, wherein said tee fitting comprises a first section and a second section each having a first end and a second end; said first end of said second section is connected to said first section between said first end and said second end, said second end of said second section is connected to said external cooling tube, and said first end of said first section is connected to said axle housing.

4. The cooling system of claim 3, further comprising a tube nut sleeve and a tube nut to connect said tee fitting second section second end to said external cooling tube.

5. The cooling system of claim 4, wherein said pump rod is positioned within said first section of said tee fitting.

6. The cooling system of claim 3, wherein said cooling tube has a first end and a second end, said second end of said tee fitting second section connects with said cooling tube first end.

7. The cooling system of claim 6, further comprising an L-fitting wherein said L-fitting is connected to said cooling tube second end and said brake housing.

8. The cooling system of claim 7, wherein said cooling tube is formed into a U-shape.

9. The cooling system of claim 2, wherein said internal pump further comprises:
   at least one washer guide assembly for centering and guiding said pump rod as it rotates within said tee fitting;
   a wave washer and a spherical washer each positioned at a second end of said pump rod to load said first and second spur gears; and
   a fitting cap connected to said tee fitting at said second end of said first section to contain the brake fluid within said tee fitting.

10. A wet disc brake fluid cooling system for drawing brake fluid out of a brake housing to cool the brake fluid comprising:
   a brake housing;
   an axle housing connected to said brake housing wherein the brake fluid can flow between said brake housing and said axle housing;
   an internal axle shaft rotatingly connected to said axle housing;
   a first spur gear in direct driving engagement with said internal axle shaft;
   an internal pump connected to said first spur gear for drawing brake fluid from said axle housing;

an external cooling tube connected to said internal pump and said brake housing for reducing the temperature of the fluid and guiding the fluid back to said brake housing.

11. The cooling system of claim 10, wherein said internal pump draws brake fluid from said brake housing and said external cooling tube guides the fluid back to said axle housing.

12. The cooling system of claim 11, wherein said internal pump comprises:

an axle straight tee fitting connected to said axle housing and said external cooling tube;

a pump rod rotatingly connected to said tee fitting, said rod having a first end extending into said axle housing;

a propeller connected to said pump rod for drawing said fluid through said cooling tube;

a second spur gear connected to said pump rod at said first end, wherein said second spur gear operatively mates with said first spur gear.

13. A wet disc brake fluid cooling system comprising:

an input shaft defining a longitudinal axis of rotation;

a pair of axle shafts driven by said input shaft to drive vehicle wheels, said axle shafts defining a lateral axis of rotation that is transverse to said longitudinal axis of rotation;

a brake housing mounted to each of said wheels and including fluid for a wet disc brake assembly;

a pump driven by at least one of said axle shafts wherein said fluid is drawn out of said brake housing to cool said fluid;

an axle housing mounted to said brake housings wherein said fluid can flow between said brake and axle housings; and an external cooling tube connected to said pump and said brake housing for reducing the temperature of said fluid and guiding said fluid back to said brake housing wherein said pump is mounted inside one of said brake or axle housings;

an axle straight tee fitting interconnecting said axle housing and said external cooling tube, a first spur gear connected to one of said axle shafts for rotation about said lateral axis of rotation, a pump rod rotatingly connected to said tee fitting and defining a vertical axis of rotation that intersects said lateral axis of rotation, a propeller connected to said pump rod for rotation about said vertical axis of rotation to draw said fluid through said cooling tube, and a second spur gear connected to said pump rod at one end, wherein said second spur gear operatively engages said first spur gear.

* * * * *